Figure 1:
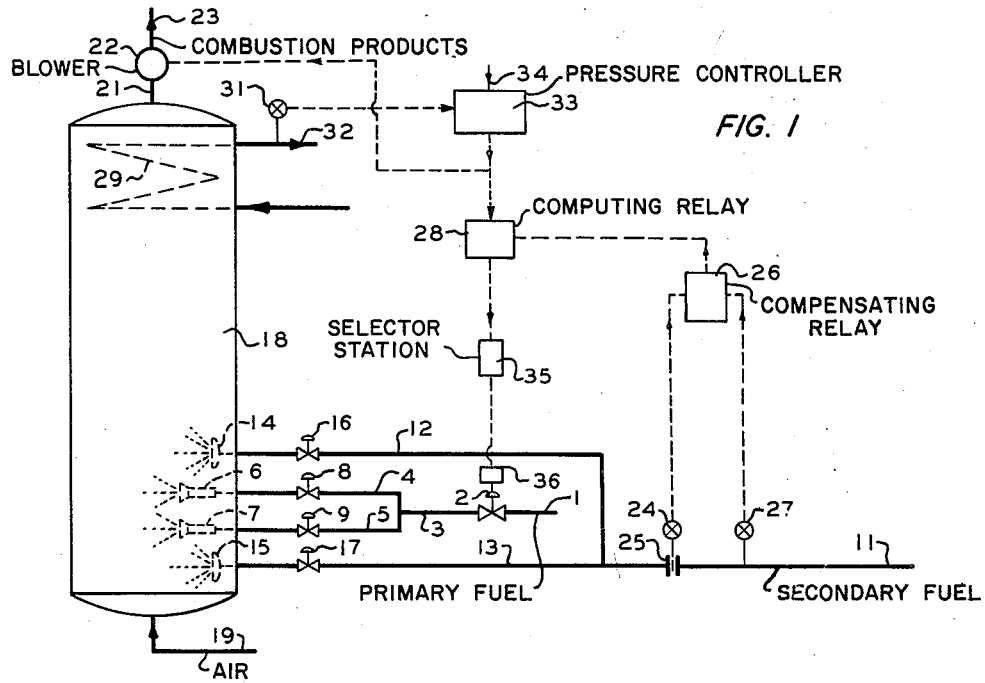

Dec. 1, 1964   C. L. OSBURN, JR., ETAL   3,159,345
CONTROL SYSTEM FOR UTILIZATION OF VARIABLE FLOW FUEL
Filed Jan. 5, 1962   3 Sheets-Sheet 1

INVENTORS
C. L. OSBURN, JR.
R. E. HAYWARD, JR.
BY
*Young & Quigg*
ATTORNEYS

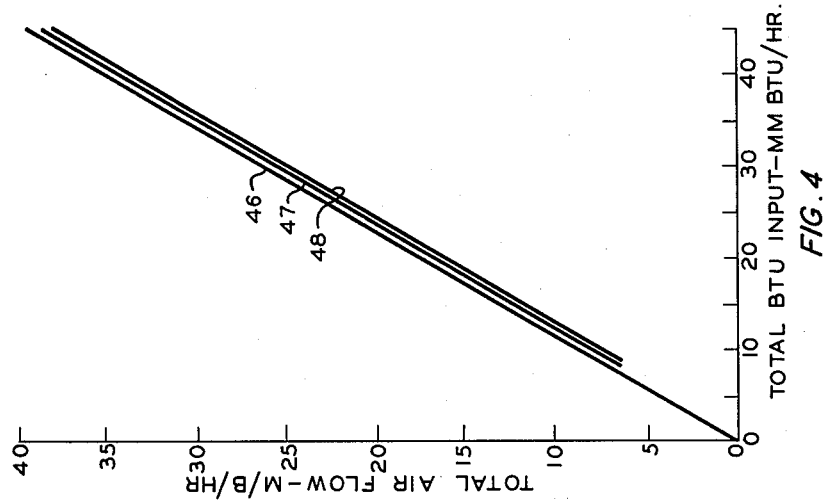
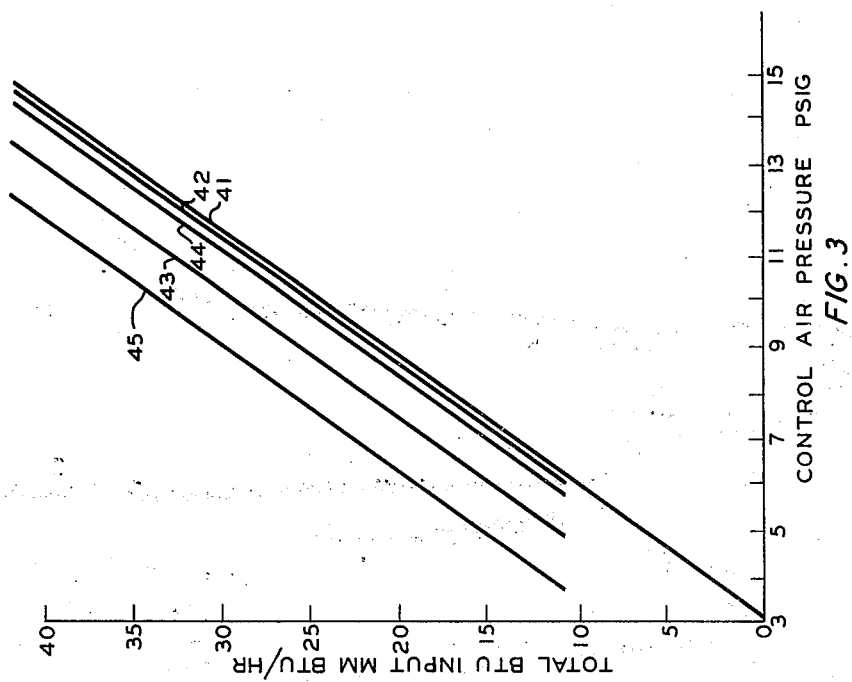

United States Patent Office 3,159,345
Patented Dec. 1, 1964

3,159,345
CONTROL SYSTEM FOR UTILIZATION OF
VARIABLE FLOW FUEL
Carl L. Osburn, Jr., and Richard E. Hayward, Jr., Bartlesville, Okla., assignors to Phillips Petroleum Company, a corporation of Delaware
Filed Jan. 5, 1962, Ser. No. 164,447
10 Claims. (Cl. 236—26)

The invention relates to a method and apparatus for controlling a fuel supply to a burner system. In one aspect the invention relates to a control system for supplying two different fuels to a burner system. In another aspect the invention relates to utilization of a variable flow fuel. In a still further aspect the invention relates to a control system for the utilization of a variable flow and low heating value fuel as a secondary fuel.

In many processes waste gas is produced, and it is often desirable to attempt to recover at least the heating value of the waste gas. However the waste gas stream is generally unsuitable for use as a primary fuel because of the low B.t.u. value, which normally is in the range of about 150 to 400 per cubic foot. Furthermore, many difficulties are encountered due to wide variations in the pressure and rate of flow of the waste gas. In burner systems utilizing a primary fuel and the waste gas as a secondary fuel, a further difficulty is encountered due to the difference in air requirements. Due to the much lower heating value of the waste gas than that of the fuel gas or natural gas, if the waste gas is injected directly into the fuel header with the primary gas any situation which causes a sudden reduction in the waste gas would result in the immediate replacement thereof by a much richer fuel having a higher air requirement. Many control systems are incapable of supplying the combustion air that would be needed immediately to accommodate the situation without increasing normal excess air concentrations and steam temperatures to undesirably high levels.

It has been discovered that many of these difficulties can be eliminated or substantially reduced through the utilization of a control system in accordance with the invention. Such a control system comprises means to determine the rate of flow of the waste gas; means to produce a signal responsive to a characteristic of the burner system; means for varying the flow of combustion air through the burner system as a function of the rate of flow of the waste gas and/or said signal; and means for varying the flow of primary fuel to the burner system as a function of the rate of flow of the waste gas and said signal.

Accordingly, it is an object of the invention to provide a system for safely and efficiently utilizing waste gas from a process as fuel gas. Another object of the invention is to provide an improved control system for a burner system utilizing a primary and secondary fuel. Another object of the invention is to provide a system for utilizing a secondary fuel having a variable rate of flow and a low heating value. Yet another object of the invention is to provide a system for controlling the amount of excess air in a burner system. Yet another object of the invention is to provide a system to effect the maximum utilization of a waste gas as a fuel in a burner system.

Other aspects, objects, and advantages of the invention will be apparent from a study of the disclosure, the drawing and the appended claims.

Figure 2:
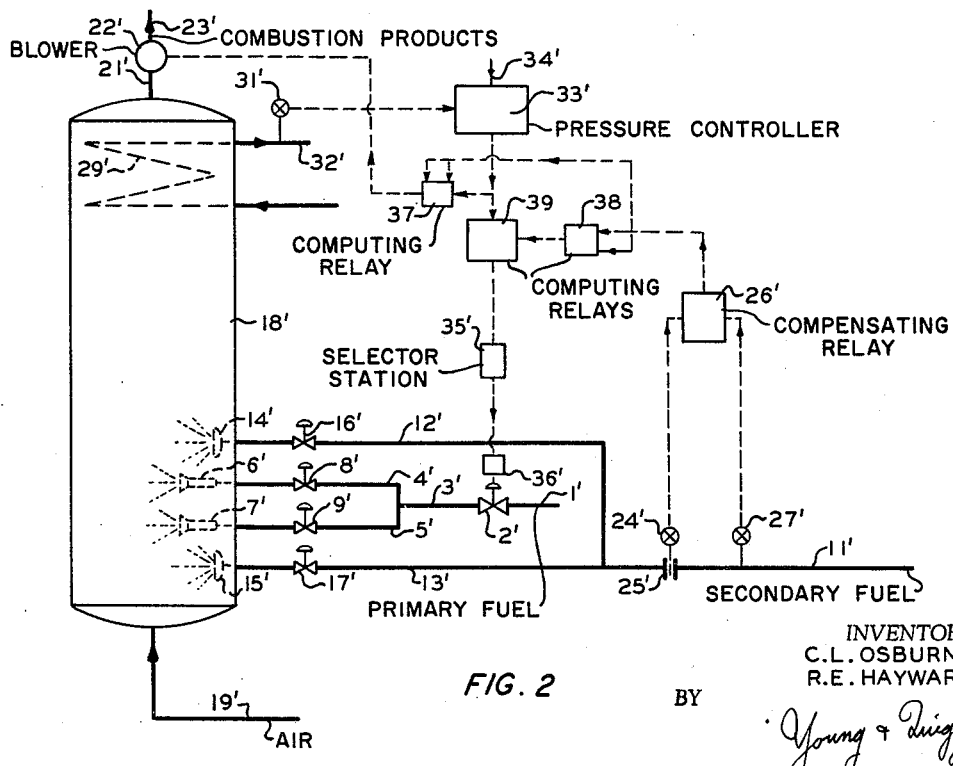
Figure 5:
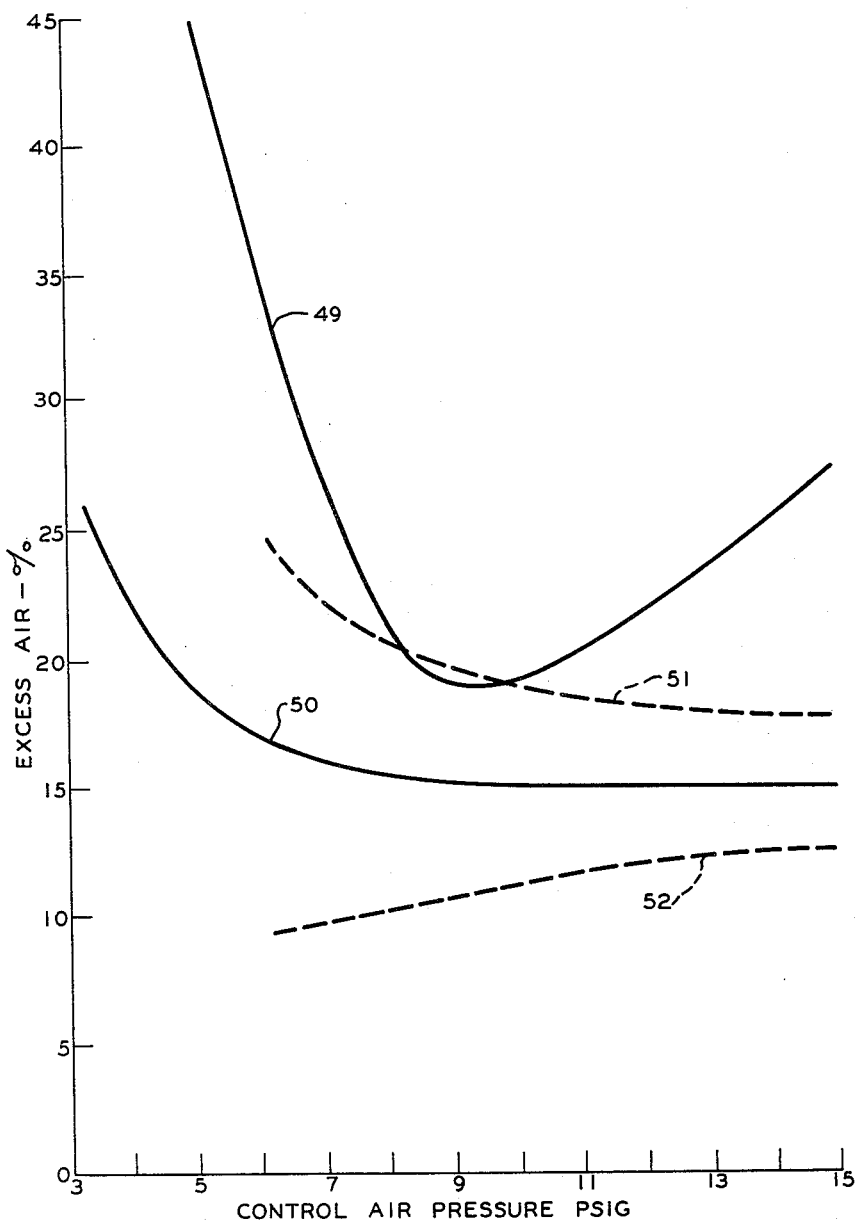

In the drawing:
FIGURE 1 is a schematic representation of a control system for a burner system in accordance with the invention;
FIGURE 2 is a schematic representation of another embodiment of a control system for a burner system in accordance with the invention;
FIGURE 3 is a graph illustrating the relationship of the control air pressure to a primary fuel motor valve and to a combustion air flow control means versus B.t.u. input for various rates of flow of waste gas;
FIGURE 4 is a graph illustrating the relationship of total combustion air flow versus total B.t.u. input for various flows of waste gas; and
FIGURE 5 is a graph illustrating the relationship of excess combustion air versus control pressure to the primary fuel motor valve for a conventional control system and for a control system in accordance with the invention.

Referring now to FIGURE 1, a primary fuel, such as natural gas or other suitable fuel gas or a mixture thereof, is passed through line 1, valve 2, line 3, and branch lines 4 and 5 to burners 6 and 7, respectively. Branch lines 4 and 5 can be provided with suitable valves 8 and 9 respectively. A secondary fuel, such as a waste gas from a process, is passed through line 11 and branch lines 12 and 13 to burners 14 and 15, respectively. Branch lines 12 and 13 can be provided with suitable valves 16 and 17, respectively. Burners 6, 7, 14 and 15 can be of any suitable type; however, it is presently preferred to utilize gun burners for burners 6 and 7 and to utilize ring burners for burners 14 and 15. While only two burners for the primary fuel and two burners for the secondary fuel have been illustrated, it is obvious that any desired number of burners can be employed for each fuel.

Burners 6, 7, 14 and 15 supply heat to furnace 18. Combustion air is passed to furnace 18 through line 19, while the products of combustion and the excess air are removed from furnace 18 through line 21. The flow of air through line 19, furnace 18, and line 21 is controlled by air flow control means 22, which can, for example, be a variable speed blower, a blower having variable pitch blades or a blower driven at a constant speed in combination with a damper control.

For maximum utilization of the waste gas, the waste gas flows uncontrolled through separate line 11 to the auxiliary burners. This results in variation in pressure corresponding to changes in ratio of flow of the waste gas. Flow transmitter 24 measures the pressure drop across an orifice 25 located in line 11 and transmits the measurement to compensating relay 26. Pressure transmitter 27 measures the pressure in line 11 and transmits the measurement to compensating relay 26. Compensating relay 26 produces an output signal which is proportional to the square root of the product of the pressure drop across orifice 25 and the pressure in line 11. Thus, the output of relay 26 is representative of the rate of flow of the waste gas in line 11 corrected for static pressure variations. The output of relay 26 is transmitted to computing relay 28.

Boiler 18 contains a coil 29, through which is passed a process fluid, such as steam, to be heated. Pressure transmitter 31 measures the pressure in outlet line 32 of coil 29 and transmits the measurement to pressure controller 33 wherein it is compared against a setpoint 34.

The output of pressure controller 33, which is a function of the difference between actual pressure transmitted by pressure transmitter 31 and the desired pressure as indicated by setpoint 34, is transmitted to computing relay 28. Thus the input to computing relay 28 from pressure controller 33 is representative of the total fuel required by the burner system, and the input to computing relay 28 from compensating relay 26 is representative of the actual flow of waste gas.

However, the primary fuel and the waste gas have different combustion air requirements with the primary fuel having the higher combustion air requirement. Computing relay 28 can be calibrated to adjust the primary fuel flow for variations in the waste gas flow upon a combustion air requirement basis. The output of computing relay 28, which is representative of the required rate of flow of primary fuel, is transmitted through selector station 35 to valve positioner 36 to manipulate the position of valve 2 in primary fuel line 1, and thus to control the rate of flow of primary fuel to boiler 18. Selector station 35 permits changing the control of valve positioner 36 to manual control, if desired.

Thus when the waste gas flow increases, the flow of primary fuel will be decreased on the basis of equivalent combustion air requirement. However, due to the differences in the B.t.u. content of the waste gas and the primary fuel, this decrease in the primary fuel flow will be insufficient to prevent an increase in the total B.t.u. input to boiler 18. Such an increase in total B.t.u. input to the boiler 18 will result in an increase in the pressure in line 32, which will be transmitted to pressure controller 33 by pressure transmitter 31. Pressure controller 33 then transmits a signal to computing relay 28 that less total fuel is desired. Computing relay 28 will then further decrease the flow of primary fuel to the boiler. The output of pressure controller 33 is also transmitted to air flow control means 22 to maintain the proper combustion air to fuel ratio. The cams in valve positioner 35 can be shaped to compensate for any non-linear characteristics of the motor valve 2 and the air flow control means 22. The cams can also be shaped to incorporate desired excess air increase at low loads. Sensitivity changes can be made by adjusting valve positioner 36.

Table I sets forth examples of components which can be utilized in the control system of FIGURE 1.

TABLE I

Component:     Description
25 _____Daniel Standard Orifice Meter Run.
24 _____Bailey type CC 1352A Pneumatic Flow Transmitter.
27, 31 _Ashcroft Type 1260 Pneumatic Pressure Transmitter.
26 _____Bailey Type AR8062A Remote Adjustable compensating relay.
28 _____Bailey Type AR8052A Remote Adjustable computing relay.
35 _____Bailey Type Am3200 Mini-Line Selector Station.
2 _____Fisher Type 567AR Diaphragm Motor Valve.

In FIGURE 2 there is disclosed a preferred embodiment of a control system in accordance with the invention and wherein components labeled with prime numbers are identical to the components in FIGURE 1 labeled with the corresponding numbers. In order to effect a more accurate control of the air to fuel ratio in view of the difference in the combustion air requirements of the waste gas the primary fuel, the output of relay 26' which is representative of the flow of waste gas in line 11', is transmitted to computing relay 37, wherein it is applied as two separate inputs with one of the inputs being delayed in time with respect to the other. Pressure controller 33' transmits a signal to computing relay 37 that is representative of the combustion air requirement on the basis of the primary fuel being the only fuel or on the basis of a predetermined flow of waste gas. Computing relay 37 compares the input from pressure controller 33' with the change in the rate of flow of the waste gas and produces an output signal representative of the required air flow for both the waste gas flow rate and the primary gas flow rate. The output signal from computing relay 37 is transmitted to air flow control means 22'.

The output from compensating relay 26' is also applied as two inputs to computing relay 38 with one of the inputs being delayed in time with respect to the other. The output of computing relay 38, which is representative of the rate of change of the waste gas flow in line 11', is transmitted to computing relay 39 where it is compared with the demand signal from pressure controller 33'. The output of computing relay 39 is representative of the required rate of flow of the primary fuel and is transmitted through selector station 35' to valve positioner 36'. Valve positioner 36' then manipulates valve 2' to pass the required amount of primary fuel from line 1' through line 3' to burners 6' and 7'. Computing relay 39 can be manipulated to provide an adjustable proportional band for the control air going to valve positioner 36'.

Table II sets forth examples of components which can be utilized in control system of FIGURE 2.

TABLE II

Component:     Description
24 _____Bailey Type CC 1352A Pneumatic Flow Transmitter.
27', 31' ____Ashcroft Type 1260 Pneumatic Pressure Transmitter.
26' _____Bailey Type AR8062A Remote Adjustable Compensating Relay.
37, 38, 39 _Bailey Type 5315750CA5 Computing Relay.
35 _____Bailey Type Am3200 Mini-Line Bias Selector Station.
2 _____Fisher Type 567AR Diaphragm Motor Valve.

Referring now to FIGURE 3, line 41 represents a typical relationship between total B.t.u. input and the control air pressure to the motor valve in the primary fuel line and to the air flow control means when only primary fuel is utilized. Line 42 represents a typical relationship between total B.t.u. input and the control air pressure to the air flow control means when the waste gas is supplying a first valve B.t.u./hr. to the burner system, while line 43 represents a typical relationship between total B.t.u. input and the control air pressure to the primary fuel motor valve when the waste gas supplies said first valve of B.t.u./hr. Line 44 represents a typical relationship between total B.t.u. input and the control air pressure to the air flow control means when the waste gas supplies a higher value of B.t.u./hr., while line 45 represents a typical relationship between total B.t.u. input and the control air pressure to primary fuel motor valve when the waste gas supplies said higher value of B.t.u./hr. Thus FIGURE 3 readily illustrates the effect of the differences in the combustion air requirements of the primary fuel and the waste gas. FIGURE 3 also illustrates how the rate of flow of the primary fuel is controlled responsive to variations in the rate of flow of the waste gas.

Referring to FIGURE 4, line 46 is representative of a typical relationship between total air flow and total B.t.u. input for primary fuel only. Line 47 is representative of a typical relationship between total air flow and total B.t.u. input when the waste gas supplies said first value B.t.u./hr., and line 48 is representative of a typical relationship between total air flow and total B.t.u. input when the waste gas supplies said higher value of B.t.u./hr. Thus FIGURE 4 readily illustrates that the waste gas has a lower combustion air requirement than the primary fuel, and the greater the flow of waste gas for a particular B.t.u. total input the smaller the amount of combustion air required.

Referring to FIGURE 5, curve 49 is representative of a typical relationship between excess air and control air pressure to the fuel valve for a single fuel system. Curve 50 is representative of a typical relationship between excess air and the control air pressure to the primary fuel valve for a control system in accordance with the invention. Curves 51 and 52 are representative of the upper and lower limits, respectively, for a 20 percent variation in the B.t.u. content of the waste gas utilized in determining curve 50. As illustrated in FIGURE 5, a control system in accordance with the invention permits a burner system to operate at a lower value of excess air than a conventional control system, and thus more efficiently, over a wider range of load on the burner system.

While the invention has been illustrated as utilizing the pressure of the outlet line 32 of coil 29 as one of the variables to which the control system is responsive, it is within the contemplation of the invention to use other factors, such as total B.t.u. input to the burner system, total B.t.u. transferred to coil 29, rate of flow of fluid in line 32, and the like.

The example set forth in Table III is presented as a further illustration of the invention but is not to be construed in limitation thereof.

Table III sets forth data for the operation of a boiler at various operating loads and with various rates of flow of waste gas. Case I, case II, case III, and case IV correspond to boiler loads of 27 M#/hr., 21 M#/hr., 16 M#/hr., and 10.3 M#/hr., respectively. Column $a$ under each case corresponds to the operating condition wherein the primary gas is the only fuel supplied to the boiler. Column $b$ under each case corresponds to the waste gas supplied 4.32 M B.t.u/hr. with the primary gas supplying the remaining required B.t.u. input. Column $c$ under each case corresponds to the waste gas supplied 8.64 M B.t.u./hr. with the primary gas supplying the remaining B.t.u. required.

computing means, means for producing a second signal responsive to the pressure in said second conduit and transmitting said second signal to said first computing means, said first computing means being adapted to produce a third signal which is representative of the rate of flow in said second conduit compensated for variations in pressure in said second conduit, a second computing means, means for transmitting said third signal to said second computing means, said second computing means being adapted to produce a fourth signal which is representative of the change in the compensated rate of flow of fuel in said second conduit, a pressure controller, means for producing a fifth signal responsive to the pressure of the fluid in said coil and transmitting said fifth signal to said pressure controller, said pressure controller being adapted to compare said fifth signal against a predetermined desired value and to produce a sixth signal which is representative of the difference between said fifth signal and said predetermined desired value which in turn is representative of the change in demand requirements of said furnace, a third computing means, means for transmitting said sixth signal to said third computing means, means for transmitting said fourth signal to said third computing means, said third computing means being adapted to compare said fourth and sixth signals and to produce a seventh signal representative of the change in the flow rate of primary fuel required to meet said demand requirements of said furnace, a valve in said first conduit, and means for controlling said valve responsive to said seventh signal.

2. Apparatus according to claim 1 further comprising a fourth computing means, means for transmitting said third signal to said fourth computing means, means for transmitting said sixth signal to said fourth computing means, said fourth computing means being adapted to produce an eighth signal representative of the change in combustion air requirement due to change in compensated

TABLE III

*Boiler Data at Various Operating Loads*

| | Case I | | | Case II | | | Case III | | | Case IV | | |
|---|---|---|---|---|---|---|---|---|---|---|---|---|
| | a | b | c | a | b | c | a | b | c | a | b | c |
| Boiler Load, M#/hr | 27.0 | 27.0 | 27.0 | 21.0 | 21.0 | 21.0 | 16.0 | 16.0 | 16.0 | 10.3 | 10.3 | 10.3 |
| Waste Gas Flow, M s.c.f.h | 0 | 13.5 | 27.0 | 0 | 13.5 | 27.0 | 0 | 13.5 | 27.0 | 0 | 13.5 | 27.0 |
| Waste Gas Heat, MM B.t.u./hr | 0 | 4.32 | 8.64 | 0 | 4.32 | 8.64 | 0 | 4.32 | 8.64 | 0 | 4.32 | 8.64 |
| Primary Gas Heat, MM B.t.u./hr | 42.0 | 37.68 | 33.36 | 32.7 | 28.38 | 24.06 | 24.9 | 20.58 | 16.26 | 16.0 | 11.68 | 7.36 |
| Primary Gas Flow, M s.c.f.h | 46.7 | 41.8 | 37.0 | 36.4 | 31.5 | 26.8 | 27.6 | 22.8 | 18.0 | 17.8 | 13.0 | 8.2 |
| Total B.t.u. input, MM | 42.0 | 42.0 | 42.0 | 32.7 | 32.7 | 32.7 | 24.9 | 24.9 | 24.9 | 16.0 | 16.0 | 16.0 |
| Air Req'd M#/hr | 31.5 | 31.3 | 31.0 | 24.6 | 24.3 | 24.1 | 18.7 | 18.4 | 18.1 | 12.0 | 11.7 | 11.4 |
| Air supplied M#/hr | 36.2 | 36.0 | 35.6 | 28.3 | 28.0 | 27.7 | 21.5 | 21.2 | 20.8 | 13.8 | 13.5 | 13.1 |
| Control Air Pressures to positioners on: | | | | | | | | | | | | |
| Primary Fuel Motor Valve | 15.0 | 13.75 | 12.50 | 12.35 | 11.10 | 9.90 | 10.10 | 8.85 | 7.62 | 7.57 | 6.34 | 5.10 |
| Air Flow control means | 15.0 | 14.91 | 14.80 | 12.40 | 12.30 | 12.20 | 10.15 | 10.05 | 9.90 | 7.58 | 7.47 | 7.35 |

Reasonable variation and modification are possible within the scope of the disclosure, the drawings and the appended claims to the invention.

We claim:

1. Apparatus comprising a furnace, a plurality of primary burners located in a lower portion of said furnace, a plurality of auxiliary burners located in a lower portion of said furnace, a coil mounted in heat exchanging relationship with said furnace, means adapted for passing a fluid to be heated through said coil, means for controlling the rate of flow of combustion air through said furnace, a source of a primary fuel, a source of a secondary fuel having a variable flow rate and low heating value, a first conduit for passing fuel from said source of primary fuel to said primary burners, a second conduit for passing fuel from said source of secondary fuel to said auxiliary burners, a first computing means, an orifice located in said second conduit, means for producing a first signal responsive to the pressure drop across said orifice and transmitting said first signal to said first rate of flow of said secondary fuel in said second conduit and change in said demand requirements of said furnace, and means for manipulating said means for controlling the rate of flow of combustion air responsive to said eighth signal.

3. Apparatus comprising a furnace, a plurality of primary burners located in a lower portion of said furnace, a plurality of auxiliary burners located in a lower portion of said furnace, a coil mounted in heat exchanging relationship with said furnace, means adapted for passing a fluid to be heated through said coil, means for controlling the rate of flow of combustion air through said furnace, a source of a primary fuel, and a source of a secondary fuel having a variable flow rate and low heating value, a first conduit for passing fuel from said source of primary fuel to said primary burners, a second conduit for passing fuel from said source of secondary fuel to said auxiliary burners, a first computing means, an orifice located in said second conduit, means for producing a first signal responsive to the pressure drop across said orifice and transmitting said first signal to said first computing means, means for producing a second signal responsive to the pressure in said second conduit, and transmitting said second signal to said first computing means, said first computing means being adapted to produce a third signal which is representative of the rate of flow in said second conduit compensated for variations in pressure in said second conduit, a pressure controller, means for producing a fourth signal responsive to the pressure of the fluid in said coil and transmitting said fourth signal to said pressure controller, said pressure controller being adapted to compare said fourth signal against a predetermined desired value and to produce a fifth signal which is representative of the difference between said fourth signal and said predetermined desired value which in turn is representative of the change in demand requirements of said furnace, a second computing means, means for transmitting said fifth signal to said second computing means, means for transmitting said third signal to said second computing means, said second computing means being adapted to compare said third and fifth signals and to produce a sixth signal representative of the change in the flow rate of primary fuel required to meet said demand requirements of said furnace, a valve in said first conduit, and means for controlling said valve responsive to said sixth signal.

4. Apparatus according to claim 3 further comprising means for manipulating said means for controlling the rate of flow of combustion air responsive to said fifth signal.

5. Apparatus comprising a burner system having at least one primary burner and at least one auxiliary burner, a first conduit for passing a primary fuel to said at least one primary burner, a second conduit for passing a variable rate of flow of secondary fuel to said at least one auxiliary burner, a first computing means, an orifice located in said second conduit, means for producing a first signal responsive to the pressure drop across said orifice and transmitting said first signal to said first computing means, means for producing a second signal responsive to the pressure in said second conduit and transmitting said second signal to said first computing means, said first computing means being adapted to produce a third signal which is representative of the rate of flow in said second conduit compensated for variations in pressure in said second conduit, a second computing means, means for transmitting said third signal to said second computing means, said second computing means being adapted to produce a fourth signal which is representative of the change in the compensated rate of flow of fuel in said second conduit, means for producing a fifth signal responsive to a demand requirement of said burner system, a third computing means, means for transmitting said fifth signal to said third computing means, means for transmitting said fourth signal to said third computing means, said third computing means being adapted to compare said fourth and fifth signals and to produce a sixth signal representative of the changes in the flow rate of primary fuel required to meet said demand requirements of said burner system, a valve in said first conduit, and means for controlling said valve responsive to said sixth signal.

6. In a burner system comprising at least one primary burner and at least one auxiliary burner, a coil mounted in heat exchanging relationship with said burner system, a source of a primary fuel, and a source of a secondary fuel having a variable flow rate and low heating value, a method comprising passing fuel from said source of primary fuel to said at least one primary burner, passing fuel from said source of secondary fuel to said at least one auxiliary burner through a first line, producing a first signal responsive to the pressure drop across an orifice in said first line, producing a second signal responsive to the pressure in said first line, producing a third signal responsive to said first and second signals which is representative of the rate of flow in said first line compensated for variations in pressure in said first line, passing a fluid to be heated through said coil, producing a fourth signal responsive to the pressure of the fluid in said coil, comparing said fourth signal against a predetermined desired value and producing a fifth signal which is representative of the difference between said fourth and said predetermined desired value which in turn is representative of the change in demand requirements of said burner system, comparing said third and fifth signals to produce a sixth signal representative of the change in the flow rate of primary fuel required to meet said demand requirements of said burner system, and controlling the rate of flow of fuel from said source of primary fuel to said at least one primary burner responsive to said sixth signal.

7. A method in accordance with claim 6 further comprising controlling the rate of flow of combustion air to said auxiliary burner and said primary burner responsive to said fifth signal.

8. In a burner system comprising a furnace, a plurality of primary burners located in the lower portion of said furnace, a plurality of auxiliary burners located in the lower portion of said furnace, a coil mounted in heat exchanging relationship with said furnace, a source of primary fuel, and a source of secondary fuel having a variable flow rate and lower heating value; a method comprising passing fuel from said source of primary fuel through a first conduit to said primary burners, passing fuel from said source of secondary fuel through a second conduit to said auxiliary burners, establishing a first signal responsive to the pressure drop across an orifice located in said second conduit, establishing a second signal responsive to the pressure in said second conduit, establishing responsive to said first and second signals a third signal which is representative of the rate of flow in said second conduit compensated for variations in pressure in said second conduit, establishing a fourth signal which is representative of the change in said third signal, passing a fluid to be heated through said coil, establishing a fifth signal responsive to the pressure of the fluid in said coil, establishing a sixth signal which is representative of the difference between said fifth signal and the predetermined desired value, said sixth signal being representative of the change in demand requirements of said furnace, comparing said fourth and sixth signals and producing a seventh signal responsive to the comparison, said seventh signal being representative of the change in the flow rate of primary fuel required to meet said demand requirements of said furnace, and controlling the rate of passing of fuel from said source of primary fuel to said primary burners responsive to said seventh signal.

9. A method in accordance with claim 8 further comprising establishing responsive to said third and sixth signals an eighth signal representative of the change in combustion air requirement due to change in compensated rate of flow of said secondary fuel and change in said demand requirements of said furnace, and controlling the rate of flow of combustion air to said furnace responsive to said eighth signal.

10. In a burner system comprising at least one primary burner and at least one auxiliary burner, a source of secondary fuel having a variable flow rate and low heating value, and a source of primary fuel; a method comprising passing primary fuel from said source of primary fuel through a first conduit through said at least one primary burner, passing secondary fuel from said source of secondary fuel to a second conduit to said at least one auxiliary burner, establishing a first signal responsive to the pressure drop across an orifice located in said second conduit, establishing a second signal responsive to the pressure in said second conduit, establishing responsive to said first and second signals a third signal which is representative of the rate of flow of said secondary fuel through said second conduit compensated for variations in pressure in said second conduit, establishing a fourth signal which is representative of the change in said third signal, establishing a fifth signal responsive to a demand requirement of said burner system, comparing said fourth and fifth signals and producing responsive to said comparison a sixth signal representative of the changes in the flow rate of primary fuel required to meet said demand requirements of said burner system, and controlling the rate of passing of said primary fuel through said first conduit responsive to said sixth signal.

References Cited in the file of this patent

UNITED STATES PATENTS

| | | |
|---|---|---|
| 2,143,820 | Payn | Jan. 10, 1939 |
| 2,418,388 | Ziebolz | Apr. 1, 1947 |
| 3,017,869 | Profos | Jan. 23, 1962 |
| 3,049,300 | Lewis et al. | Aug. 14, 1962 |
| 3,062,271 | Rijnsdorp | Nov. 6, 1962 |

FOREIGN PATENTS

| | | |
|---|---|---|
| 864,156 | Germany | Jan. 22, 1953 |